(12) United States Patent
Choudary et al.

(10) Patent No.: US 8,227,046 B2
(45) Date of Patent: Jul. 24, 2012

(54) PROCESS FOR PREPARING SELF-ASSEMBLING NANOBINARY AND TERNARY OXY/HYDROXIDES

(75) Inventors: Boyapati Manoranjan Choudary, Andhra Pradeah (IN); Swama Jaya Vallabha, Andhra Pradeah (IN); Bontha Ramachandra Reddy, Andhra Pradeah (IN); Lakshmi Kantam Mannepalli, Andhra Pradeah (IN); Mandapati Mohan Rao, Andhra Pradeah (IN); Kottapalli Koteswara Rao, Andhra Pradeah (IN); Vijaya Raghavan Kondapuram, Andhra Pradeah (IN)

(73) Assignee: Council of Scientific and Industrial Research, New Delhi (IN)

( * ) Notice: Subject to any disclaimer, the term of this patent is extended or adjusted under 35 U.S.C. 154(b) by 761 days.

(21) Appl. No.: 11/057,783

(22) Filed: Feb. 15, 2005

(65) Prior Publication Data

US 2005/0238569 A1    Oct. 27, 2005

Related U.S. Application Data

(63) Continuation of application No. 10/306,837, filed on Nov. 29, 2002, now abandoned.

(51) Int. Cl.
  *B05D 3/10* (2006.01)
(52) U.S. Cl. ..................................................... 427/444
(58) Field of Classification Search .................. 427/445, 427/444; 423/710, 711
  See application file for complete search history.

(56) References Cited

U.S. PATENT DOCUMENTS

| | | | | |
|---|---|---|---|---|
| 2,582,254 A | * | 1/1952 | Hunter | 502/27 |
| 3,754,011 A | * | 8/1973 | Hoch | 534/11 |
| 3,983,304 A | * | 9/1976 | Sekhon | 411/504 |
| 4,812,245 A | | 3/1989 | Burba et al. | 508/381 |
| 4,917,980 A | * | 4/1990 | Badesha et al. | 430/58.2 |
| 5,032,556 A | * | 7/1991 | Mori et al. | 501/106 |
| 5,189,000 A | | 2/1993 | Masi et al. | 502/113 |
| 5,306,555 A | * | 4/1994 | Ramamurthi et al. | 442/63 |
| 5,381,149 A | | 1/1995 | Dougherty et al. | 342/1 |
| 6,180,764 B1 | | 1/2001 | Noweck et al. | 534/15 |
| 6,376,405 B1 | | 4/2002 | Stamires et al. | 502/73 |
| 6,682,706 B1 | | 1/2004 | Yamamoto et al. | 422/180 |
| 2002/0006374 A1 | | 1/2002 | Kourtakis et al. | 423/418.2 |
| 2002/0168313 A1 | | 11/2002 | Stamires et al. | 423/420.2 |

FOREIGN PATENT DOCUMENTS

| | | | |
|---|---|---|---|
| EP | 0484829 A1 | | 10/1991 |
| JP | 60146065 A | * | 8/1985 |
| WO | WO 9322237 A1 | | 11/1993 |
| WO | WO 02/068329 A1 | | 9/2002 |

OTHER PUBLICATIONS

International Search Report.

* cited by examiner

*Primary Examiner* — Elena T Lightfoot
(74) *Attorney, Agent, or Firm* — Nixon & Vanderhye P.C.

(57) ABSTRACT

A process is disclosed for preparing and self-assembly of nanobinary and ternary metal oxy/hydroxides with high surface area and 1-10 nm size by aerogel procedure, involving homogenization of metal organic precursors in solvent mixture, controlled hydrolysis, gelation, hydrothermal treatment and finally supercritical drying of solvent.

34 Claims, No Drawings

PROCESS FOR PREPARING SELF-ASSEMBLING NANOBINARY AND TERNARY OXY/HYDROXIDES

This application is a continuation of application Ser. No. 10/306,837 filed Nov. 29, 2002, now abandoned.

FIELD OF THE INVENTION

The present invention relates to a process for preparing and self-assembly of nanobinary and ternary metal oxy/hydroxides with high surface area and 1-10 nm size by aerogel procedure, involving homogenization of metal organic precursors in solvent mixture, controlled hydrolysis, gelation, hydrothermal treatment and finally supercritical drying of solvent.

During the self-assembly, the nano materials can be modulated into thin films, nano fibers, membranes, layered structures embedded with intercalated anions comprising of inorganic and organic anions selected from carbonates, phosphates, chromates, ibuprofen, dichlorofenec, salicylic acid, tartaric acid, dyes, and any other similar anions. These self-assembled materials find applications as catalysts, gene reservoirs, controlled drug release, solar energy harvesters.

BACKGROUND OF THE INVENTION

Nanomaterials have generated unprecedented interest due to their unusual physical and chemical properties with wide and divergent applications in optics, electronics, magnetics, mechanics and catalysis. Nanocrystalline metal oxides exhibit unparalleled destructive adsorption properties of acid gases, polar organics, and even chemical/biological warfare agents. Due to high surface area, these nanostructured solid materials display good catalytic activity in isomerisation, alkylation, reforming and dehydrohalogenation reactions.

Generally, aerogel samples are prepared by supercritical drying of a gel from a sol-gel reaction. The aerogel has a specific high surface area with low density. Due to its physical characteristics, aerogel sample is useful as a catalyst or as a carrier for a catalyst.

LDHs (layered double hydroxides), which consist of alternating cationic $M^{II}_{1-x}$-$M^{III}_{x}(OH)_2^{x+}$ and anionic $A^{n-}.zH_2O$ layers have received much attention in recent times in view of their potential applications as catalysts, adsorbents, biomaterials for controlled drug delivery and gene reservoirs.

Reference is made to *Nanostructured Materials.* 1999, 11, 1091 wherein nano particles of Zinc oxide and alumina were prepared independently by chemical arrested precipitation and then converted into nanocomposites by wet mixing. The inherent disadvantage of this protocol is the development of non-homogeneous material.

Reference is made to *Journal of Solid State Chemistry,* 2002, 165, 193 wherein binary oxides like titanium dioxide and tin oxide are prepared by stearic acid method wherein particle size range from 10-15 nanometers. The drawback is the system is non-homogeneous.

Reference is made to *Chemistry of Materials,* 2002, 14, 2922 wherein binary alumina and magnesium oxides were prepared by sol-gel method. The ratios of the alumina and magnesium oxides were not related to the normal hydrotalcites. The drawback is the system is non-homogeneous.

Reference is made to *Nature,* 2000, 403, 65 wherein the homogeneous nanobinary barium oxide and alumina were synthesized by reverse microemulsion technique. The particle size ranges from 3-10 nanometers. The drawback is use of expensive protocol.

Reference is made to *Microporous and Mesoporous Materials,* 2000, 39, 229 wherein the nano layered double hydroxides were prepared by sol-gel method. The drawbacks are the size of the particles are high, ranging from 300-600 nanometers and the surface area of the samples lower ranging from 240-270 m²/g.

Reference is made to *Chemistry of Materials,* 2002, 14, 4286 wherein nano-layered double hydroxides with uniform crystal size were prepared by co-precipitation in colloid mill and aging for 100° C. for 13 h. The drawback is that the particle size obtained in this method is about 60-80 nanometers.

Reference is made to *Journal of American Chemical Society,* 2000, 122, 3530 wherein the zeolite nanoparticles assembles into thin films, membranes, or fibers.

Reference is also made to *Akgewandte Chemie,* 2002, 41, 1188 wherein the quasi-spherical zinc oxide nanoparticles assemble into nanorods.

BRIEF SUMMARY

An object of the present invention is to provide a process for preparing homogeneous nanobinary and ternary metal oxy/hydroxides.

It is another object of the invention to provide a process for preparing nano materials with high surface area and low particle size.

It is another object of the invention to provide a process for the preparation of nano oxy/hydroxide material with applications as catalysts and adsorbents.

Yet another object of the invention is to provide a process for preparing nano-materials by self-assembly with anions leading to the formation of normal LDHs with applications as biomaterials for controlled drug delivery and gene reservoirs, preparation of thin films and membranes.

The present exemplary embodiments of the invention provide a process for the synthesis of homogeneous nanobinary oxy/hydroxides composed of $Mg^{2+}$ and $Al^{3+}$, and nanoterny oxy/hydroxides comprising of Ni, Mg and Al by the aerogel protocol for the first time.

Accordingly, the present exemplary embodiments of the invention provide a process for the preparation of homogeneous nanobinary or ternary metal oxy/hydroxide of LDH with high surface area and 1-10 nm particle size by an aerogel protocol, comprising hydrolysis of metal alkoxides or metal acetylacetonates in a solvent mixture selected from alcohols and hydrocarbons, by controlled addition of deionised water or a mixture thereof with alcohols, aging for 6 to 16 hours, followed by hydrothermal treatment and finally supercritical drying to obtain a free flow powder of homogeneous nanobinary or ternary metal oxy/hydroxide of LDH.

In one embodiment of the invention, the metal in the metal alkoxides/acetylacetonates is selected from the group consisting of bivalent metals ions comprising essentially of $Mg^{2+}$, and trivalent metal ions consisting essentially of $Al^{3+}$.

In another embodiment of the invention, the bivalent metal ions comprise $Mg^{2+}$ and one or more bivalent metal ions selected from the group consisting of $Ni^{2+}$, $Cu^{2+}$, $Co^{2+}$, $Zn^{2+}$, $Fe^{2+}$ and $Mn^{2+}$ ions.

In yet another embodiment of the invention, the trivalent metal ions comprise $Al^{3+}$ and one or more trivalent metal ions selected from the group consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions.

In a further embodiment of the invention, the ratio of bivalent to trivalent metal ions is in the range of from 1-5.

In another embodiment of the invention, the hydrothermal treatment is carried out at a temperature in the range of 100 to 300° C. and pressure in the range of 50 to 150 atm.

In an embodiment of the present invention, the hydrolysis comprises homogenization of metal precursors in hydrocarbon-alcohol solvent followed by controlled addition of stoichiometric amount of deionised water.

In an embodiment of the present invention, the metal alkoxides used are selected from the group consisting of methoxide, ethoxide, isomers of propoxide, butoxide and pentoxide.

In another embodiment of the present invention, the ratio of bivalent to trivalent metal ions is 2 to 3.

In an embodiment of the present invention, the solvent mixture used is selected from a mixture of any of hexane, toluene, xylene, methanol, ethanol and butanol.

In an embodiment of the present invention, the aging is preferably effected in a time period of 10 to 12 hours.

In another embodiment of the present invention, the reaction mixture is hydrothermally heated at a temperature of 1° C. per minute to a temperature in the range of 260 to 280° C., and kept for 5 to 10 minutes under higher pressures from 60 to 120 atm.

In still another embodiment of present invention, the solvent mixture is vented out at super critical conditions to obtain a free flow of nano LDH.

In yet another embodiment of the present invention, the recovered solvent free aerogel is dried overnight about 120° C. to remove the traces of solvent.

In yet another embodiment of the present invention, the surface areas of homogeneous nanobinary and ternary materials range from 500-700 m$^2$/g.

In yet another embodiment of the present invention, particle size of the homogeneous nanobinary and ternary materials ranges from 1-10 nm.

In still another embodiment of the present invention, the nanoparticles self-assemble on treatment with sodium carbonate/phosphate/chromate/ibuprofen, dicholorofenec solution at room temperature to normal layered double hydroxides.

In a further embodiment of the invention, the self assembled nanostructured LDH is obtained in the form of a hexagonal, fibrous, membrane or thin film.

The present invention also provides a process for the preparation of self-assembled layered double hydroxides made of homogeneous nanobinary or ternary metal oxy/hydroxide of LDH of high surface area and 1-10 nm particle size, comprising hydrolyzing a metal alkoxide or metal acetylacetonate in a solvent mixture selected from alcohols and hydrocarbons, by controlled addition of deionised water or a mixture thereof with alcohols, aging for 6 to 16 hours, followed by hydrothermally treating and finally supercritical drying to obtain a free flow powder of homogeneous nanobinary or ternary metal oxy/hydroxide of LDH, adding anions selected from the group consisting of carbonates, phosphates, chromates, ibuprofen, salicylic acid and tartaric acid to self assemble the free flowing powder into normal layered double hydroxides.

In one embodiment of the invention, the metal in the metal alkoxides/acetylacetonates is selected from the group consisting of bivalent metals ions comprising essentially of $Mg^{2+}$, and trivalent metal ions consisting essentially of $Al^{3+}$.

In another embodiment of the invention, the bivalent metal ions comprise $Mg^{2+}$ and one or more bivalent metal ions selected from the group consisting of $Ni^{2+}$, $Cu^{2+}$, $Co^{2+}$, $Zn^{2+}$, $Fe^{2+}$ and $Mn^{2+}$ ions.

In yet another embodiment of the invention, the trivalent metal ions comprise $Al^{3+}$ and one or more trivalent metal ions selected from the group consisting of $Ga^{1+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions.

In a further embodiment of the invention, the ratio of bivalent to trivalent metal ions is in the range of from 1-5.

In another embodiment of the invention, the hydrothermal treatment is carried out at a temperature in the range of 100 to 300° C. and pressure in the range of 50 to 150 atm.

In an embodiment of the present invention, the hydrolysis comprises homogenization of metal precursors in hydrocarbon-alcohol solvent followed by controlled addition of stoichiometric amount of deionised water.

In an embodiment of the present invention, the metal alkoxides used are selected from the group consisting of methoxide, ethoxide, isomers of propoxide, butoxide and pentoxide.

In another embodiment of the present invention, the ratio of bivalent to trivalent metal ions is 2 to 3.

In an embodiment of the present invention, the solvent mixture used is selected from a mixture of any of hexane, toluene, xylene, methanol ethanol and butanol.

In an embodiment of the present invention, the aging is preferably effected in a time period of 10 to 12 hours.

In another embodiment of the present invention, the reaction mixture is hydrothermally heated at a temperature of 1° C. per minute to a temperature in the range of 260 to 280° C., and kept for 5 to 10 minutes under higher pressures from 60 to 120 atm.

In still another embodiment of present invention, the solvent mixture is vented out at super critical conditions to obtain a free flow of nano LDH.

In yet another embodiment of the present invention, the recovered solvent free aerogel is dried overnight about 120° C. to remove the traces of solvent.

In yet another embodiment of the present invention, the surface areas of homogeneous nanobinary and ternary materials range from 500-700 m$^2$/g.

In yet another embodiment of the present invention, particle size of the homogeneous nanobinary and ternary materials ranges from 1-10 nm.

In still another embodiment of the present invention, the nanoparticles self-assemble on treatment with sodium carbonate/phosphate/chromate/ibuprofen, dicholorofenec solution at room temperature to normal layered double hydroxides.

In a further embodiment of the invention, the self assembled nanostructured LDH is obtained in the form of a hexagonal, fibrous, membrane or thin film.

DETAILED DESCRIPTION OF EXEMPLARY EMBODIMENTS OF THE INVENTION

The novelty of the present invention relates to a process for preparing and self-assembly of nanobinary and ternary metal oxy/hydroxides of Mg—Al binary (Mg/Al ratios 2:1 and 3:1) and Ni—Mg—Al ternary systems [(Mg+Ni)/Al ratios (1.3+0.7):1 and (1.9+1.1):1] by aerogel procedure, involving homogenization of metal organic precursors in solvent mixture, controlled hydrolysis, gelation, hydrothermal treatment and finally supercritical drying of solvent. The novelty of the present invention provides a process for manufacturing of homogeneous nanobinary and ternary metal oxy/hydroxides by aerogel method with an increased surface area. The self-assembly of the nano metal-oxy/hydroxides when mediated by anion forms normal layered double hydroxides. These self-assembled materials finds applications as catalysts, gene reservoirs, controlled drug release, solar energy harvesters.

The nanobinary and ternary metal oxy/hydoxides have particle size ranging from 1-10 nanometers and high surface area in the range of 500-700 m$^2$/g. Preferred compositions are made from alkoxides and acetylacetonates of the desired metals. The nanobinary and ternary metal oxy/hydoxides prepared in the present invention have an excellent self-assembling property and can be modulated into thin films, fibers, membranes, when mediated by anions selected from inorganic and organic anions such as carbonates, phosphates, chromates, ibuprofen, dichlorofenec, salicylic acid, tartaric acid, dyes, and any other similar anions. The unprecedented self-assembly of these nanoparticles driven by anion to normal LDH, helps in controlled drug release, solar energy harvester, gene reservoir.

The process of the present invention generally comprises an aerogel protocol, comprising hydrolysis of metal alkoxides/acetylacetonates selected from bivalent metals ions comprising $Mg^{2+}$ or any other metals consisting of $Ni^{2+}$, $Cu^{2+}$, $Co^{2+}$, $Zn^{2+}$, $Fe^{2+}$ and $Mn^{2+}$ ions and trivalent metal ions selected from $Al^{3+}$ and optionally other metals consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions in different ratios of M(II)/M(III) ranging from 1-5 in a solvent mixture selected from alcohols/hydrocarbons, by controlled addition of deionised water/their mixtures with alcohols, aging for 6 to 16 hours, followed hydrothermal treatment at temperatures ranging from 100 to 300° C. and pressures ranging from 50 to 150 atm and finally supercritical drying to obtain a free flow powder and the nanostructured LDH self assembled by the addition of anions selected from carbonates, phosphates, chromates, ibuprofen, salicylic acid, tartaric acid, etc, into normal layered double hydroxides in hexagonal, fibrous, membrane or thin film.

Hydrolysis preferably involves homogenization of metal precursors in hydrocarbon-alcohol solvent followed by controlled addition of stoichiometric amount of deionised water. Metal alkoxides used are selected from methoxide, ethoxide, isomers of propoxide, butoxide and pentoxide. Preferred ratio of bivalent and trivalent metal ions is 2 to 3.

The solvent mixture used is selected from hexane, toluene, xylene, methanol, ethanol, butanol etc., and aging is preferably done for 10 to 12 hours. The reaction mixture is hydrothermally heated with the ramping of temperature 1° C. per minute to 260 to 280° C., and kept for 5 to 10 minutes under higher pressures from 60 to 120 atm. The solvent mixture is vented out at super critical conditions to obtain a free flow of nano LDH. The recovered solvent free aerogel is dried overnight about 120° C. to remove the traces of solvent. The surface areas of homogeneous nanobinary and ternary materials range from 500-700 m$^2$/g and particle size ranges from 1-10 nm. It is observed that the nanoparticles self-assemble on treatment with sodium carbonate/phosphate/chromate/ibuprofen, dicholorofenec solution at room temperature to normal layered double hydroxides.

The following examples are given by way of illustration of the present invention and therefore should not be constructed to limit the scope of invention.

EXAMPLE 1

Preparation of Nanobinary Mg/Al (2/1) System

In aerogel method, magnesium turnings (2.4 g, 0.1M) were allowed to react with freshly dried methanol (100 mL) under argon flow by stirring. Dry toluene (300 mL) was added to the resultant magnesium methoxide solution and continued stirring for 2 hours. Aluminum isopropoxide (10.235 g, 0.05M) (for 2:1 system) was then added to the resultant solution and stirred for 2 more hours. Then stoichiometric amount of deionised water (4.85 mL) was added using capillary addition pump over a period of 0.5 h. This solution was kept under stirring overnight at room temperature. The pH of the slightly milky white solution was found to be >7. The resultant solution was placed in an autoclave, heated in 4 hours to 265° C. with a resultant pressure of 60-80 atm, kept for 10 min, vented to obtain an aerogel material and further dried at 120° C. to remove the traces of solvent.

EXAMPLE 2

Preparation of Nanoternary Ni+Mg/Al ((0.7+1.3)/1) System

In aerogel method, magnesium turnings (1.56 g, 0.13M) were allowed to react with freshly dried methanol (65 mL) under argon flow. Under vigorous stirring, dry toluene (195 mL) was added to the resultant magnesium methoxide solution and stirred for 2 hours. Aluminum isopropoxide (20.475 g, 0.1M) was then added to the resultant solution and stirred for 2 more hours. Nickel acetylacetonate (17.99 g, 0.07 M) (for 2:1 system) was added to the resultant solution and stirred for 2 more hours. Then stoichiometric amount of deionised water (10.26 mL) was added using capillary addition pump over a period of 0.5 hours. This solution was kept under stirring overnight at room temperature. The pH of the slightly milky white solution was found to be >7. The resultant solution was placed in an autoclave, heated to 265° C. in 4 hours with a resultant pressure of 120-130 atm, kept for 10 minutes, vented to obtain an aerogel material and further dried at 120° C. to remove the traces of solvent.

EXAMPLE 3

Preparation of Nanobinary Mg/Al (3/1) System

In aerogel method, magnesium turnings (1.8 g, 0.075 M) were allowed to react with freshly dried methanol (75 mL) under argon flow. Under vigorous stirring, dry toluene (225 mL) was added to the resultant magnesium methoxide solution and stirred for 2 hours. Aluminum isopropoxide (5.12 g, 0.025M) (for 3:1 system) was then added to the resultant solution and stirred for 2 more hours. Then stoichiometric amount of deionised water (4.05 mL) was added using capillary addition pump over a period of 0.5 hours. This solution was kept under stirring overnight at room temperature. The pH of the slightly milky white solution was found to be >7. The resultant solution was placed in an autoclave, heated to 265° C. in 4 hours with a resultant pressure of 60-80 atm, kept for 10 min. vented to obtain an aerogel material and further dried at 120° C. to remove the traces of solvent.

EXAMPLE 4

Preparation of Nanoternary Ni+/Mg/Al ((0.9+2.1)/1) System

In aerogel method, magnesium turnings (1.68 g, 0.07M) were allowed to react with freshly dried methanol (70 mL) under argon flow. Under vigorous stirring, dry toluene (210 mL) was added to resultant magnesium methoxide solution and stirred for 2 hours. Aluminum isopropoxide (6.757 g, 0.033M) was then added to resultant solution and stirred for 2 more hours. Nickel acetylacetonate (7.76 g. 0.03 M) (for 3:1 system) was added to the resultant solution and stirred for 2 more hours. Then stoichiometric amount of deionised water (5.38 mL) was added using capillary addition pump over a period of 0.5 hours. This solution was kept under stirring overnight at room temperature. The pH of the slightly milky white solution was found to be >7. The resultant solution was placed in an autoclave, heated to 265° C. in 4 hours, kept for 10 minutes with a resultant pressure of 120-130 atm, vented to obtain an aerogel material and further dried at 120° C. to remove the traces of solvent.

EXAMPLE 5

The self-assembly of the nanobinary $Mg^{2+}$ and $Al^{3+}$ is done at room temperature by adding sodium carbonate (0.025 M/20 mL) to the nanoparticles (0.1 g) and stirred for 6 hours. The slurry was filtered, washed till the filtrate was neutral and oven dried at 100° C.

EXAMPLE 6

Self-assembly of nanobinary $Mg^{2+}$ and $Al^{3+}$ is done at room temperature by adding disodium hydrogen orthophosphate (50 mL, 0.1 M) to the nanoparticles (0.5 g) and stirred for 6 hours. The slurry was filtered, washed till filtrate was neutral and oven dried at 100° C.

EXAMPLE 7

The self-assembly of nanobinary $Mg^{2+}$ and $Al^{3+}$ is done at room temperature by adding potassium dichromate (35 mL, 0.1 M) to the nanoparticles (0.5 g) and stirred for 6 hours. The slurry was filtered, washed till the filtrate is colorless and oven dried at 100° C.

EXAMPLE 8

The self-assembly of nanobinary $Mg^{2+}$ and $Al^{3+}$ is done at room temperature by dissolving 1.0 g of Ibuprofen in 55 mL of 0.1 M of sodium hydroxide solution to the solution nanoparticles (0.1 g) is added and stirred for 6 hours. The slurry was filtered, washed till the filtrate was neutral and oven dried at 100° C.

EXAMPLE 9

The self-assembly of the nanoternary $Ni^{2+}$—$Mg^{2+}$ and $Al^{3+}$ is done at room temperature by adding sodium carbonate (0.025 M/20 mL) to the nanoparticles (0.1 g) and stirred for 6 hours. The slurry was filtered, washed till the filtrate was neutral and oven dried at 100° C.

The main advantages of the present invention are
1. A novel method for the preparation of homogeneous nanobinary and ternary metal oxy/hydroxides.
2. The nano materials have high surface area.
3. The particle size of the materials is very low.
4. The nano oxy/hydroxide material has potential applications as catalysts, adsorbents.
5. The self-assembly of the nano materials with anions leads to the formation of normal LDHs.
6. This self-assembly phenomena has potential applications as biomaterials for controlled drug delivery and gene reservoirs, preparation of thin films and membranes.

We claim:
1. A process for the preparation of a homogeneous nanobinary or ternary metal oxy/hydroxide of LDH with a high surface area and a 1-10 nm particle size by an aerogel protocol, comprising in the following sequence:

reacting metal turnings with dry alcohol to form metal alkoxides or metal acetylacetonates,
homogenization of metal alkoxides or metal acetylacetonates in a solvent mixture of dry toluene and methanol,
hydrolysis of said metal alkoxides or metal acetylacetonates in said solvent mixture of toluene and methanol, by controlled addition of deionised water or a mixture thereof with alcohols,
aging for 6 to 16 hours,
followed by hydrothermal treatment, and
supercritical drying to obtain a free flow powder of homogeneous nanobinary or ternary metal oxy/hydroxide of LDH, wherein the powder has a high surface area and a 1-10 nm particle size.

2. A process as in claim 1 wherein the metal in metal alkoxides/acetylacetonates is selected from the group consisting of bivalent metals ions consisting essentially of $Mg^{2+}$ and trivalent metal ions consisting essentially of $Al^{3+}$.

3. A process as in claim 2 wherein the bivalent metal ions comprise $Mg^{2+}$ and one or more bivalent metal ions selected from the group consisting of $Ni^{2+}$, $Cu^{2+}$, $Co^{2+}$, $Zn^{2+}$, $Fe^{2+}$ and $Mn^{2+}$ ions.

4. A process as in claim 2 wherein the trivalent metal ions comprise $Al^{3+}$ and one or more trivalent metal ions selected from the group consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions.

5. A process as in claim 2 wherein the ratio of bivalent to trivalent metal ions is in the range of from 1-5.

6. A process as in claim 1 wherein the hydrothermal treatment is carried out at a temperature in the range of 100 to 300° C. and pressure in the range of 50 to 150 atm.

7. A process as in claim 1 wherein the hydrolysis comprises homogenization of metal precursors in the solvent followed by controlled addition of stoichiometric amount of deionised water.

8. A process as in claim 1 wherein the metal alkoxides used are selected from the group consisting of methoxide, ethoxide, isomers of propoxide, butoxide and pentoxide.

9. A process as in claim 5 wherein the ratio of bivalent to trivalent metal ions is 2 to 3.

10. A process as in claim 1 wherein the solvent mixture further includes hexane, xylene, ethanol or butanol.

11. A process as in claim 1 wherein the aging is preferably effected in a time period of 10 to 12 hours.

12. A process as in claim 1 wherein the reaction mixture is hydrothermally heated at a temperature of 1° C. per minute to a temperature in the range of 260 to 280° C., and kept for 5 to 10 minutes under higher pressures from 60 to 120 atm.

13. A process as in claim 1 wherein the solvent mixture is vented out at supercritical conditions to obtain a free flow of nano LDH.

14. A process as in claim 1 wherein the recovered solvent free aerogel is dried overnight about 120° C. to remove the traces of solvent.

15. A process as in claim 1 wherein the surface areas of homogeneous nanobinary and ternary materials range from 500-700 $m^2/g$.

16. A process as in claim 1 wherein the obtained powder nanoparticles are treated with sodium carbonate/phosphate/chromate/ibuprofen, diclofenac solution at room temperature to self-assemble into normal self-assembled nanostructured layered double hydroxides.

17. A process as in claim 16 wherein the self assembled nanostructured LDH is obtained in the form of a hexagonal, fibrous, membrane or thin film.

18. A process for the preparation of self-assembled layered double hydroxides made of homogeneous nanobinary or ternary metal oxy/hydroxide of LDH of a high surface area and a 1-10 nm particle size, comprising:
- reacting metal turnings with dry alcohol to form metal alkoxides or metal acetylacetonates,
- homogenization of metal alkoxides or metal acetylacetonates in a solvent mixture of dry toluene and methanol,
- hydrolyzing said metal alkoxide or metal acetylacetonate in said solvent mixture of toluene and methanol, by controlled addition of deionised water or a mixture thereof with alcohols,
- aging for 6 to 16 hours,
- followed by hydrothermally treating and finally supercritical drying to obtain a free flow powder of homogeneous nanobinary or ternary metal oxy/hydroxide of LDH, wherein the powder has a high surface area and a 1-10 nm particle size, and
- adding anions selected from the group consisting of carbonates, phosphates, chromates, ibuprofen, salicylic acid and tartaric acid to self assemble the free flowing powder into normal layered double hydroxides.

19. A process as in claim 18 wherein the metal in metal alkoxides/acetylacetonates is selected from the group consisting of bivalent metals ions consisting essentially of $Mg^{2+}$ and trivalent metal ions consisting essentially of $Al^{3+}$.

20. A process as in claim 19 wherein the bivalent metal ions comprise $Mg^{2+}$ and one or more bivalent metal ions selected from the group consisting of $Ni^{2+}$, $Cu^{2+}$, $Co^{2+}$, $Zn^{2+}$, $Fe^{2+}$ and $Mn^{2+}$ ions.

21. A process as in claim 19 wherein the trivalent metal ions comprise $Al^{3+}$ and one or more trivalent metal ions selected from the group consisting of $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ and $In^{3+}$ ions.

22. A process as in claim 19 wherein the ratio of bivalent to trivalent metal ions is in the range of from 1-5.

23. A process as in claim 18 wherein the hydrothermal treatment is carried out at a temperature in the range of 100 to 300° C. and pressure in the range of 50 to 150 atm.

24. A process as in claim 18 wherein the hydrolysis comprises homogenization of metal precursors in the solvent followed by controlled addition of stoichiometric amount of deionised water.

25. A process as in claim 18 wherein the metal alkoxides used are selected from the group consisting of methoxide, ethoxide, isomers of propoxide, butoxide and pentoxide.

26. A process as in claim 22 wherein the ratio of bivalent to trivalent metal ions is 2 to 3.

27. A process as in claim 18 wherein the solvent mixture further includes hexane, xylene, ethanol or butanol.

28. A process as in claim 18 wherein aging is effected for time of 10 to 12 hours.

29. A process as in claim 18 wherein the reaction mixture is hydrothermally heated at a temperature of 1° C. per minute to a temperature in the range of 260 to 280° C., and kept for 5 to 10 minutes under higher pressures from 60 to 120 atm.

30. A process as in claim 18 wherein the solvent mixture is vented out at super critical conditions to obtain a free flow of nano LDH.

31. A process as in claim 18 wherein the recovered solvent free aerogel is dried overnight about 120° C. to remove the traces of solvent.

32. A process as in claim 18 wherein the surface areas of homogeneous nanobinary and ternary materials range from 500-700 $m^2/g$.

33. A process as in claim 18 wherein the powder nanoparticles are treated with sodium carbonate/phosphate/chromate/ibuprofen, diclofenac solution at room temperature to normal layered double hydroxides.

34. A process as in claim 18 wherein the self assembled nanostructured LDH is obtained in the form of a hexagonal, fibrous, membrane or thin film.

* * * * *